United States Patent
Van der Knaap et al.

(10) Patent No.: US 8,991,539 B2
(45) Date of Patent: Mar. 31, 2015

(54) SUSPENSION ASSEMBLY FOR SUSPENDING A CABIN OF A TRUCK OR THE LIKE VEHICLE

(75) Inventors: Albertus Clemens Maria Van der Knaap, Helmond (NL); Robert M. A. Frank Verschuren, Eindhoven (NL); Jeroen Vandenhoudt, Deurne (NL); Raymond B. C. Tinsel, Eindhoven (NL); Ronny Maria Theophilus Wouters, Ubachsberg (NL)

(73) Assignee: Nederlandse Organisatie voor toegepast-natuurwetenschappelijk onderzoek TNO, VK Delft (NL)

( * ) Notice: Subject to any disclaimer, the term of this patent is extended or adjusted under 35 U.S.C. 154(b) by 239 days.

(21) Appl. No.: 12/745,181

(22) PCT Filed: Nov. 26, 2008

(86) PCT No.: PCT/NL2008/050746
§ 371 (c)(1),
(2), (4) Date: Nov. 4, 2010

(87) PCT Pub. No.: WO2009/070014
PCT Pub. Date: Jun. 4, 2009

(65) Prior Publication Data
US 2011/0057478 A1    Mar. 10, 2011

(30) Foreign Application Priority Data
Nov. 27, 2007   (EP) .................................. 07121695

(51) Int. Cl.
*B62D 33/08*      (2006.01)
*B62D 33/067*    (2006.01)
(Continued)

(52) U.S. Cl.
CPC ............ *B62D 33/067* (2013.01); *B60G 99/008* (2013.01); *B62D 33/0608* (2013.01)
USPC ................... 180/89.14; 280/5.507; 280/5.509

(58) Field of Classification Search
CPC .. B60D 33/10; B62D 33/0608; B62D 33/067; B62D 33/08; B60G 99/008
USPC ......... 180/89.14, 89.13; 296/190.07; 280/5.5, 280/5.507, 5.508, 5.509, 5.515, 684, 679, 280/124.13, 124.137, 124.149, 5.511
See application file for complete search history.

(56) References Cited

U.S. PATENT DOCUMENTS

| | | | | |
|---|---|---|---|---|
| 3,298,709 A | * | 1/1967 | Mercier | 280/104 |
| 3,396,984 A | * | 8/1968 | Cadiou | 280/5.509 |
| 4,253,700 A | * | 3/1981 | Di Francescantonio | 296/190.05 |

(Continued)

FOREIGN PATENT DOCUMENTS

| | | |
|---|---|---|
| DE | 19533478 C1 | 1/1997 |
| DE | 19805463 A1 | 8/1999 |

(Continued)

*Primary Examiner* — Karen Beck
(74) *Attorney, Agent, or Firm* — DLA Piper LLP (US); Jennifer Lacroix

(57) ABSTRACT

The invention relates to a suspension assembly (1) for suspending a cabin (2) of a truck or the like vehicle. The assembly comprises a plurality of spring members (4a-d) arranged between the cabin (2) and a chassis of the vehicle, and a torsion bar (5) extending between at least two of said spring members (4a-d) so as to increase the roll stiffness of the assembly. The assembly further comprises an actuator (6) with which a torsion angle of the torsion bar (5) can be adjusted allowing active roll stabilization of the cabin (2).

9 Claims, 4 Drawing Sheets

(51) Int. Cl.
*B60G 99/00* (2010.01)
*B62D 33/06* (2006.01)

(56) References Cited

U.S. PATENT DOCUMENTS

| | | | |
|---|---|---|---|
| 4,483,409 A | 11/1984 | Fun | |
| 4,638,878 A * | 1/1987 | Komp | 180/89.13 |
| 4,903,984 A * | 2/1990 | Kajiwara et al. | 280/5.515 |
| 5,299,651 A * | 4/1994 | Wilson | 180/89.12 |
| 6,073,714 A * | 6/2000 | McHorse et al. | 180/89.14 |
| 6,206,121 B1 * | 3/2001 | Michel | 180/89.13 |
| 6,439,651 B1 * | 8/2002 | Johansson et al. | 296/190.07 |
| 6,805,361 B2 * | 10/2004 | Germano et al. | 280/5.511 |
| 6,874,792 B2 * | 4/2005 | Vortmeyer et al. | 280/5.511 |
| 7,004,870 B2 * | 2/2006 | Kroppe | 475/86 |
| 7,077,226 B2 * | 7/2006 | Oliver et al. | 180/89.12 |
| 7,232,180 B2 * | 6/2007 | Biasiotto et al. | 296/190.07 |
| 7,832,739 B2 * | 11/2010 | Pinkos et al. | 280/5.511 |
| 7,909,339 B2 * | 3/2011 | Pinkos et al. | 280/5.511 |
| 8,371,562 B2 * | 2/2013 | Knevels | 267/64.27 |
| 2004/0084857 A1 * | 5/2004 | Vortmeyer et al. | 280/5.511 |
| 2007/0080011 A1 * | 4/2007 | Kang | 180/89.14 |
| 2007/0150144 A1 * | 6/2007 | Yasui | 701/38 |
| 2008/0211201 A1 * | 9/2008 | Nakajima | 280/124.13 |
| 2008/0309032 A1 * | 12/2008 | Keane et al. | 280/5.509 |
| 2009/0091094 A1 * | 4/2009 | Sano | 280/5.511 |
| 2009/0152824 A1 * | 6/2009 | Grieshaber et al. | 280/5.509 |
| 2010/0187778 A1 * | 7/2010 | Grau et al. | 280/5.508 |
| 2011/0025000 A1 * | 2/2011 | Inoue et al. | 280/5.507 |
| 2011/0025001 A1 * | 2/2011 | Kajino | 280/5.515 |
| 2011/0049818 A1 * | 3/2011 | Van der Knaap et al. | 280/5.508 |
| 2013/0099455 A1 * | 4/2013 | Beringer et al. | 280/5.508 |

FOREIGN PATENT DOCUMENTS

| | | |
|---|---|---|
| DE | 102004059274 A1 | 6/2006 |
| DE | 10 2005 009 952 A1 | 9/2006 |
| DE | 10 2004 017 088 B4 | 3/2007 |
| EP | 1719644 A1 | 5/2006 |
| EP | 1 785 293 A1 | 5/2007 |
| FR | 2766422 A1 | 7/1997 |
| JP | 52143613 A | 11/1977 |
| JP | 2000313218 A | 11/2000 |
| WO | WO 2005/108128 A3 | 11/2005 |

* cited by examiner

SUSPENSION ASSEMBLY FOR SUSPENDING A CABIN OF A TRUCK OR THE LIKE VEHICLE

The invention relates to a suspension assembly for suspending a cabin of a truck or the like vehicle. Such a suspension assembly is generally referred to and will hereinafter be referred to as 'a secondary suspension assembly', in contrast to 'a primary suspension assembly', used for suspending the vehicle wheels.

Typically, a secondary suspension assembly comprises a number of spring members arranged between the cabin and a chassis of the vehicle. To enhance driving comfort, the spring members preferably have a relatively low spring stiffness. This, however, may cause the cabin to experience rather large displacements during use, such as large roll motions when negotiating bends. The latter may affect the vehicle's steering behaviour. To reduce this problem, known suspension assemblies are equipped with a torsion bar, connecting a left and right side spring member so as to increase the overall roll stiffness of the assembly. The torsion bar may furthermore serve to guide vertical movements of the cabin and to facilitate tilting forward thereof, to provide access to components lying underneath the cabin, such as a motor.

To effectively decrease aforementioned roll motions, the torsion bar should have a relatively high torsion stiffness. This, however, may affect the driving comfort, for instance in situations where the left and right wheels of the vehicle are excited asymmetrically.

Therefore, a need exists for an improved secondary suspension assembly, which on the one hand provides for enhanced roll behaviour and steering behaviour and at the other hand provides for acceptable driving comfort.

To that end, an assembly according to the invention is characterized in that an actuator is provided with which a torsion angle of the torsion bar can be adjusted. Accordingly, the torsion bar can be used for active roll stabilisation by counteracting any roll motions of the cabin. As a consequence, the suspension members and the torsion bar can each have a relatively low stiffness, now that large cabin displacements caused by such low stiffnesses can be effectively suppressed. The low stiffnesses will prevent high frequent disturbances from exciting the cabin and as such enhance the driving comfort.

According to one aspect of the invention, the actuator can be arranged near an end of the torsion bar. Alternatively, the actuator may be positioned somewhere halfway, interconnecting two parts of the torsion bar. The position of the actuator can thus be freely varied, enabling efficient use of space. In case where the actuator is of the hydraulic type, its position may for instance be chosen so as to minimize the length of hydraulic supply and return lines, which will benefit its dynamic behaviour, e.g. its response time.

According to another aspect of the invention, the torsion bar can be coupled to the cabin by means of one or more ball joints. These ball joints can adapt their orientation to misalignments and/or deformations of the torsion bar, thereby allowing the torsion bar to pivot smoothly during use, without excessive frictional forces and/or excessive deformation stresses in the respective components.

According to yet another aspect of the invention, the actuator can be a hydraulic actuator. Such hydraulic actuator can be fed by a hydraulic supply circuit with a reservoir, a pump and control means for controlling the flow rate to and from the actuator or the pressure levels in the actuator. The pump may be driven by the combustion motor of the truck. Alternatively, the pump can be driven by a separate motor, for instance an electric motor. Such separate motor allows the actuator to be operated completely independent from the combustion motor, thus allowing active roll stabilisation to be in action when the combustion motor is shut off, and vice versa. By switching the motor on and off strategically, energy can be saved while an acceptable level of driving comfort can be maintained.

According to another aspect of the invention, the assembly may comprise a stabiliser bar, arranged to have its torsion axis extend substantially parallel to that of the torsion bar. Such stabiliser can provide for residual roll stiffness when the active roll stabilisation is deactivated. It furthermore can guide the cabin in vertical direction and help to stabilize it in the horizontal plane. It may also facilitate tilting forward of the cabin.

According to a further aspect of the invention, active roll stabilisation may be based on various control strategies. According to one control strategy, the roll motions may be suppressed completely, so as to keep the cabin substantially horizontally or at least parallel to the road surface. Such control strategy may greatly facilitate the steering behaviour of the truck. According to an alternative control strategy, the roll motions may be controlled to keep the cabin substantially in parallel with the chassis of the truck. Such control strategy helps to provide the driver with a realistic feeling of the actual truck and/or cabin motions and as such may help in achieving safe driving behaviour.

Additionally or alternatively the control strategy may depend on the driving conditions. For instance, when driving straight forward, at relatively high speeds, the cabin is likely to experience little roll motions. Accordingly, the active roll control may be switched off and energy may be saved. When driving at relatively low speeds, the cabin is more likely to experience roll motions, which may for instance be induced by road turns and/or a bumpy road surface. In such case, the active roll control may be switched on to its fullest. Other control strategies and/or combinations thereof are conceivable.

Further advantageous embodiments of an assembly according to the invention and a truck provided therewith are set forth in the dependent claims.

To explain the invention, exemplary embodiments thereof will hereinafter be described with reference to the accompanying drawings, wherein.

Figure 5:
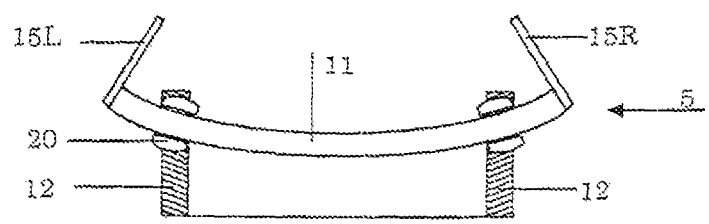
Figure 6:
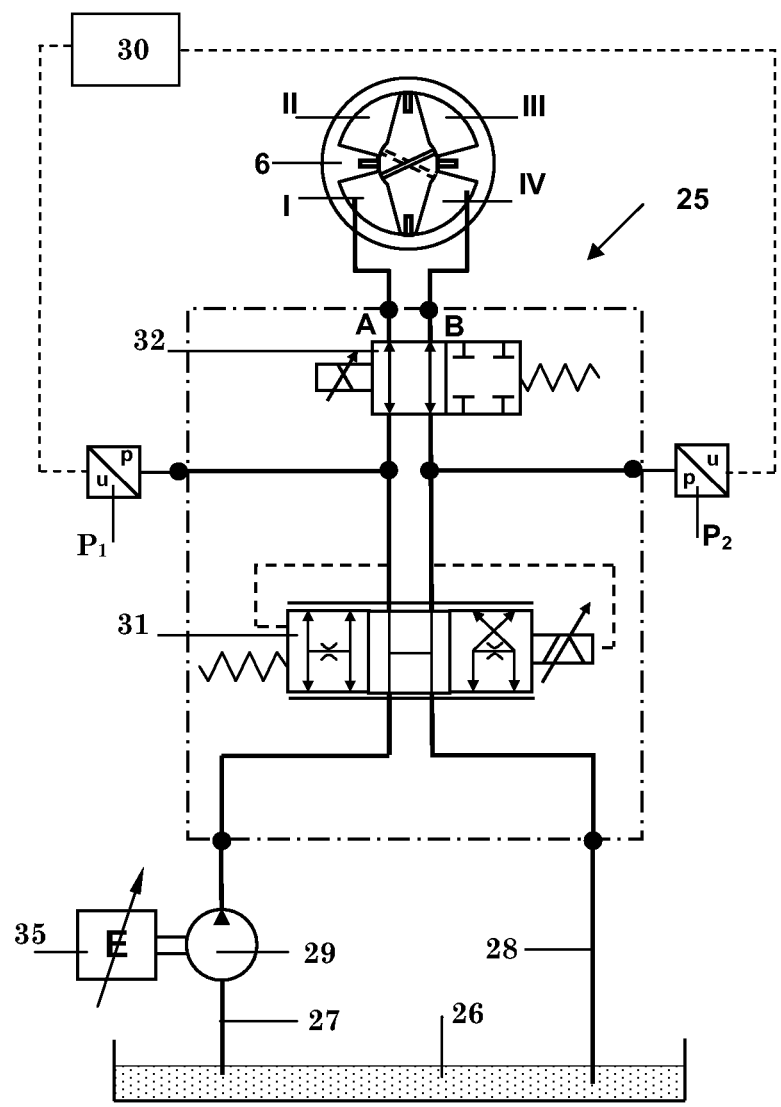
Figure 7:
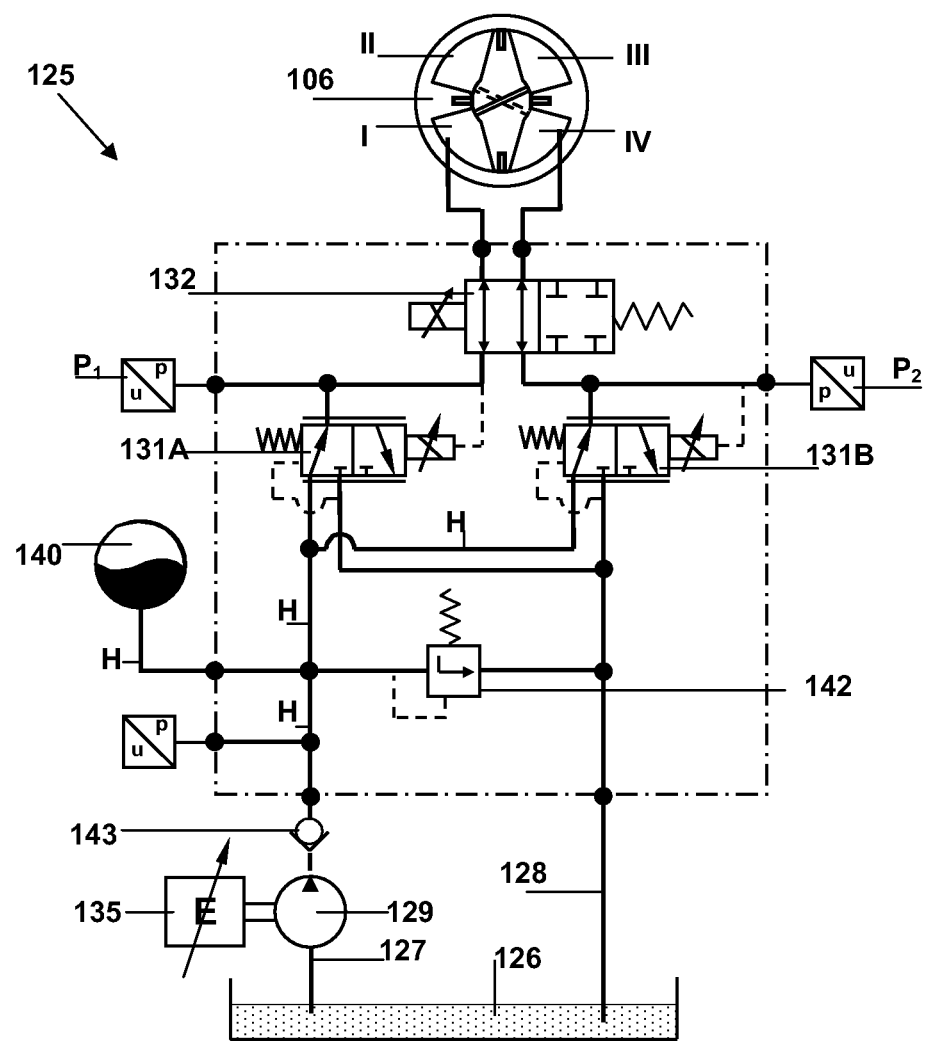

FIG. 5 schematically shows the pivot connection of the torsion bar to the cabin;

FIG. 6 schematically shows a hydraulic actuator and supply circuit for a suspension assembly according to the invention; and FIG. 7 shows an alternative embodiment of a supply circuit.

Figure 1:
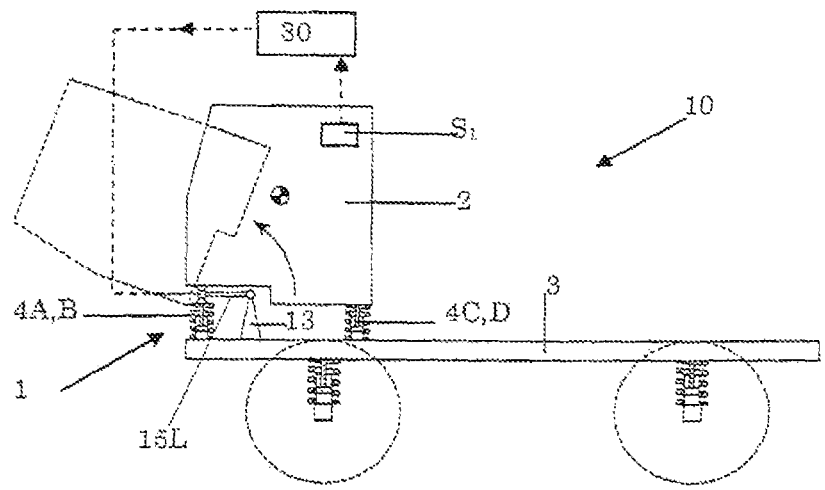
FIG. 1 shows, in side view, a truck with a cabin suspension assembly according to the invention.
Figure 2:
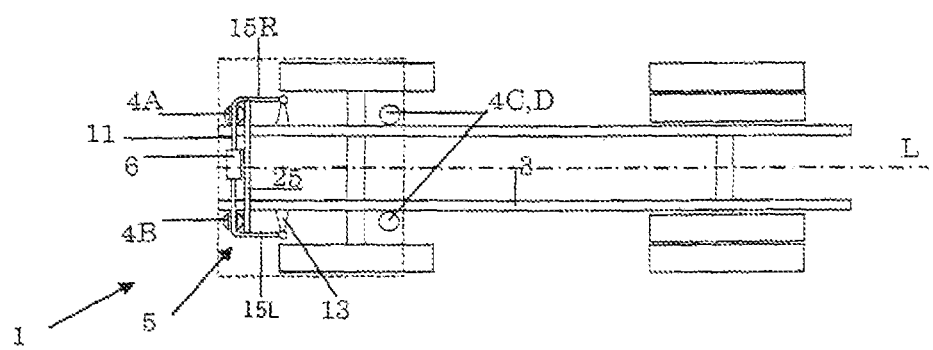
FIG. 2 shows, in top view, the truck of FIG. 1 with the cabin suspension assembly according to the invention.

FIGS. 1 and 2 schematically show a truck 10 comprising a chassis 3 and a cabin 2 which is mounted onto the chassis 3 via a suspension assembly 1 according to the invention. The suspension assembly 1 comprises, at least in the illustrated embodiment, four spring members 4A-D, arranged near the corners of the cabin 2. These spring members 4A-D may for instance be construed as air springs.

The assembly 1 further comprises a torsion bar 5 which extends between the front spring members 4A, B, an actuator 6 for adjusting a torsion angle of said torsion bar 5, measurement means $S_i$ for measuring a roll parameter of the cabin 2, and a control unit 30 for controlling the actuator 6 based on data received from the measurement means $S_i$. It is noted that the term "bar" should be interpreted broadly and not be limited to a straight bar.

Figure 3:
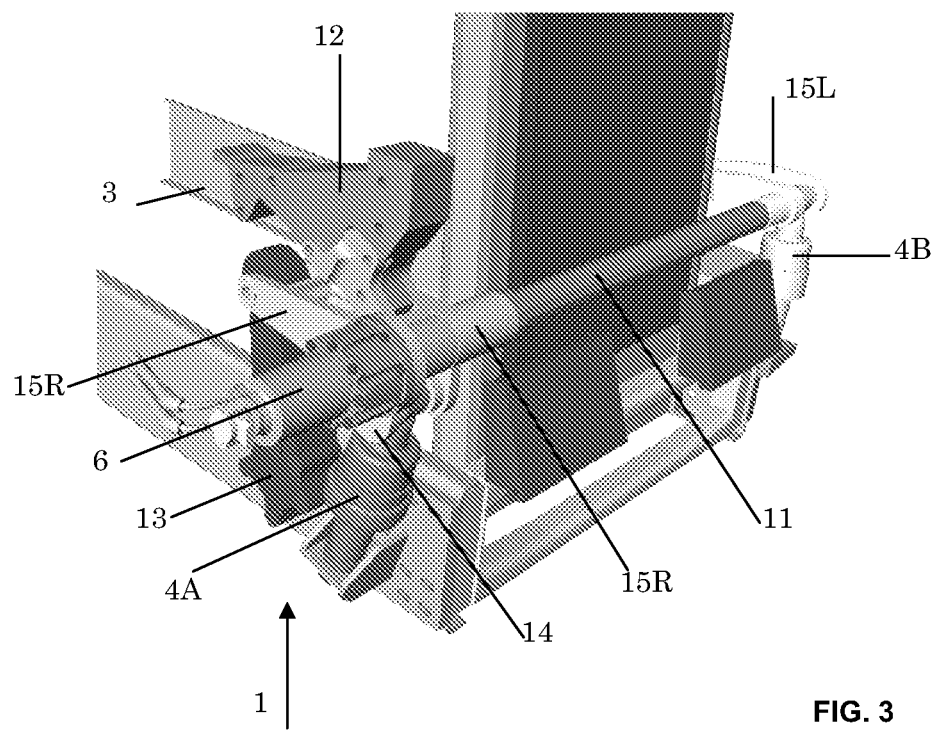
FIG. 3 shows in further detail an embodiment of a cabin suspension assembly according to the invention.
Figure 4:
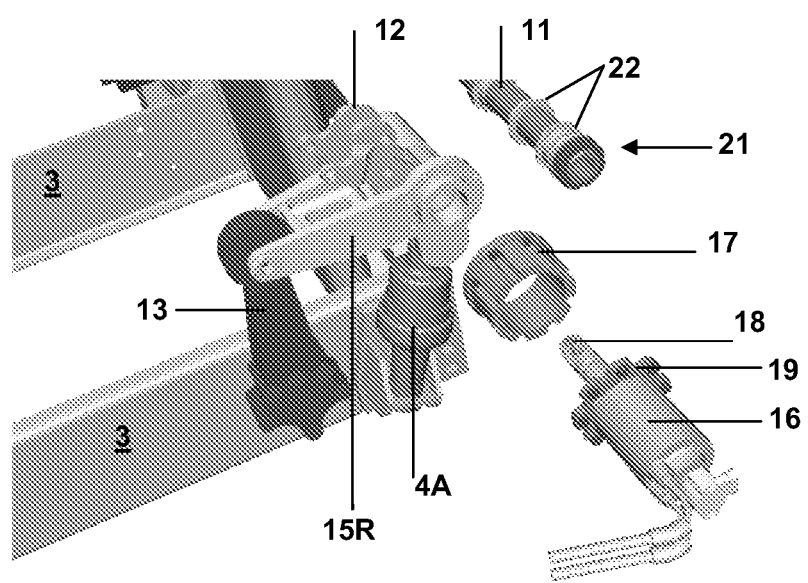
FIG. 4 shows the suspension assembly of FIG. 3 in exploded view.

As best seen in FIGS. 3 and 4, the torsion bar 5 comprises a midsection 11 which with two angled arms 15L, R is pivotally connected to brackets 13 of the chassis 3. The torsion bar 5 is further pivotally connected to an upper end of the two front spring members 4A, B via suitable brackets 14, and pivotally connected to the cabin 2 via suitable brackets 12. The latter connection may for instance make use of ball joints 20, as schematically shown in FIG. 5. Such ball joints 20 can absorb any misalignment which may be present between the brackets 12 and the midsection 11 due to for instance manufacturing inaccuracies and/or deformation of said components during use. Thus, jamming and accompanying high frictional forces and excessive wear can be prevented. Instead, the torsion bar 5 can pivot smoothly during use, which is beneficial for the cabin's overall driving comfort.

The actuator 6 may be mounted in the midsection 11 of the torsion bar 5, as schematically shown in FIG. 2. Alternatively, the actuator 6 may be arranged at the junction of the midsection 11 with one of the arms 15R, as shown in FIGS. 3 and 4. In the illustrated embodiment, the actuator 6 is configured as a rotation actuator having a stationary house 16 and a rotary part 18. The house 16 is fixated to the arm 15R by means of for instance a bushing 17, a flange 19 and suitable fastening means. The rotary part 18 is fixated to an end 21 of the midsection 11 by means of for instance a spline. Said end 21 and the rotary part 18 are rotatably supported in the arm 15R by means of bearings 22 (see FIG. 4). The other end of the midsection 11 is fixated to the other arm 15L.

The suspension assembly 1 functions as follows. During use, when driving over an irregular road surface or when taking turns, the cabin 2 will be subject to roll motions (i.e. rotations around a longitudinal axis L of the truck 10, see FIG. 2). These roll motions can be detected by the measurement means $S_i$, which to that end may for instance be arranged to sense lateral and/or roll displacement, velocity and/or acceleration of the cabin 2. Based on these data, the control unit 30 may control the actuator 6 to adjust a torsion angle of the torsion bar 5 so as to at least partly counteract said roll motions. Depending on a selected control strategy, the actuator 6 may be controlled to suppress the roll motions completely, so as to keep the cabin 2 substantially horizontal, or at least parallel to the road surface. This may contribute to good, i.e. direct steering behaviour. According to an alternative control strategy, the actuator 6 may be controlled to keep the cabin 2 parallel to the chassis 3. This may provide a driver of the truck 10 with realistic feedback of the actual roll angle. Of course, other control strategies are possible.

The actuator 6 may be a hydraulic rotation actuator, with for instance four chambers I-IV, as shown in FIG. 6. The actuator 6 is linked to a hydraulic supply circuit 25, comprising a hydraulic reservoir 26, a supply line 27, a return line 28 and pumping means 29 for circulating hydraulic fluid between the reservoir 26 and the actuator 6. The circuit 25 further comprises several valves 31, 32, sensors $P_i$ and aforementioned control unit 30 for controlling a pressure level in the actuator 6.

In the illustrated embodiment, the valves include a fail-safe valve 32, arranged to cut off any supply to and from the actuator 6, in case of some failure in for instance the supply circuit 25. The valves furthermore include a pressure control valve 31, for controlling a pressure difference or anti-roll moment at the actuator side. The pressure control valve 31 may for instance be a proportional control valve 31 (as illustrated in FIG. 6) enabling the pressure to be controlled proportionally variable to an input command between a base pressure and a maximum pressure. To that end, the valve 31 may include a plunger that from an open centre position (as shown in FIG. 6) is operable in two directions. In the open centre position the pressure will be substantially equal in all actuator chambers I-IV. When displacing the plunger to the right, the pressure in the lower left chamber I and upper right chamber III will increase so as to generate a positive pressure difference and a positive (i.e. counter clockwise) anti-roll moment at the actuator side. By driving the plunger to the other side, a negative anti-roll moment will be generated. In either case, the magnitude of the generated pressure difference and anti-roll moment depends on the displacement stroke of the plunger. Thanks to the open centre position of the plunger, the transition from positive to negative pressure difference can be smooth. The open centre position furthermore allows for hydraulic fluid to be returned to the reservoir 26, substantially without resistance, in case where no moment is required at the actuator side.

The pumping means 29 may be driven by the combustion motor of the truck 10. Alternatively, a separate motor may be provided, for instance an electric motor 35 as shown in FIG. 6. Such motor 35 can be relatively compact and as such offers much design freedom as to potential built-in locations. It furthermore allows the active roll stabilisation to be switched on and off at desire, i.e. completely independent of the combustion motor. Thus, the active roll stabilisation may be active when the truck 10 is at rest and its combustion motor is shut off. This may for instance be advantageous in cases where the cabin 2 is used to sleep in. Also, the active roll stabilisation may be deactivated in cases where it is not needed, for instance when driving straight forward, over a relatively smooth road surface. Under such conditions, the cabin 2 is not likely to experience considerable roll motions. By switching off the motor 35 energy can be saved.

The decision to switch the motor 35 on or off may for instance be based on the velocity of the truck 10, which can be readily measured with suitable sensors. As long as the velocity is relatively high, for instance above 60 km/hr, the driver is not likely to effect considerable steering actions and consequently roll disturbances are not likely to occur. Consequently, the roll stabilisation feature can be deactivated with relatively little risk and/or little loss in drive comfort. As the velocity drops below a certain threshold value, for instance below 50 km/h, the motor 35 may be switched on again. Of course these values are for illustrative purposes only. They should not be construed as limiting.

To provide the suspension assembly 1 with sufficient residual roll stiffness in case where the motor 35 and active roll stabilisation are switched off, the assembly 1 may be provided with a supplementary bar or stabiliser bar 25, extending substantially parallel to the torsion bar 5 as schematically shown in FIG. 2. This stabilizer bar 25 preferably has a relatively low torsion stiffness and relatively high bending stiffness, which may for instance be achieved by providing the bar 25 with a C-shaped cross section. As such, the bar 25 will hardly affect the operation of the adjustable torsion bar 5 but will be able to stabilize the cabin 2 in the horizontal plane and guide vertical movements thereof. As the stabilizer bar 25 can absorb most of the external bending loads acting on the assembly 1, the torsion bar 5 may be of relatively light design, with a relatively low torsion stiffness. This is beneficial for the high frequent driving comfort of the cabin 2, which is predominantly determined by the torsion stiffness of the adjustable torsion bar 5. It also allows the spring members 4A-D to be levelled with a relative simple, conventional levelling system, instead of a more complex provision, wherein each member requires its own levelling system.

When the motor 35 is switched on again, it may take some time before sufficient hydraulic pressure has built up for the actuator 6 to be able to deliver a certain anti-roll moment. This response time may be taken into account when deciding when to switch the motor 25 off and on. Also, the need for active roll stabilization may be anticipated by monitoring precursors of external roll disturbances, such as for instance the steering angle (assuming that a steering angle ushers a turn and a turn invokes roll disturbances). The motor 35 can then be restarted in an early stage, so as to allow the assembly 1 sufficient time to built up the necessary hydraulic pressure.

Alternatively, the hydraulic actuator 6 can be combined with a hydraulic circuit 125 according to FIG. 7. Like components have been denoted with like reference numerals, increased by 100. The circuit 125 differs from the one shown in FIG. 6 in that the proportional pressure control 4/3 valve 31 has been replaced by two 3/2 valves, more particularly two proportional 'closed centre' pressure reduction valves 131A, B for controlling the pressure difference at the actuator side. Such valve arrangement in rest or centre position supplies the actuator with hydraulic pressure and substantially closes off all return lines to a hydraulic fluid reservoir. In addition, the circuit 125 is provided with an accumulator 140, a pressure controlled pressure relief valve 142 and a check valve 143.

The circuit 125 of FIG. 7 is arranged to lower the pressure in the actuator chambers I-IV by having the pumping means 129 suction hydraulic fluid from the reservoir 126 into the high pressure zone H of the circuit 125. With valves 131A, B in the illustrated position, the pressure will be essentially equal in all actuator chambers I-IV. By switching over valve 131B, hydraulic fluid in chamber II and IV will return to the reservoir causing the actuator 106 to rotate counter clockwise and generate a positive anti-roll moment. To generate a negative anti-roll moment the other valve 131A is switched over. The pressure near the pumping means 135 and/or the accumulator 140 can be readily controlled by the motor 135 in cooperation with the pressure relief valve 142. When the pressure in the high pressure zone H reaches a desired level, the motor 135 can be switched off. In such case, the check valve 143 prevents hydraulic fluid from returning to the reservoir 126 via the switched off pumping means 129.

The circuit 125 according to FIG. 7 offers several advantages. First of all, thanks to the accumulator 140 and the valves 131A, B, in particular their closed centre configuration, a certain amount of hydraulic reserve can at all times be stored in the circuit 125, even when the motor 135 is switched off. Thanks to such hydraulic reserve, the assembly 1 can have good response behaviour. It furthermore allows the use of smaller pumping means 129. Also, thanks to the closed centre configuration of the valves 131A, B, all actuator chambers I-IV will be connected to the high pressure zone H when the truck is driven straight ahead (corresponding to the state illustrated in FIG. 7). In this state, hydraulic fluid will be able to flow almost without resistance from one chamber to the other during rotational movements of the actuator (due to roll motions of the cabin 2 relative to the chassis 3). Consequently, the delivered moment will be practically zero and the damping resulting from said rotational movement will be low. This will be beneficial for the driving comfort, as hardly any irregularities in the road surface will be transferred to the cabin 2.

Furthermore, any other pressure peaks that may arise in the circuit 125 during use can be reduced or equalized by the buffering action of the accumulator 140. This too is beneficial for the driving comfort. In addition, the closed centre configuration of the valves 131A, B allows for a relatively simple fail safe valve 132. Generally, such fail safe valve 132 will feature a safety mode in which hydraulic fluid is allowed to return to the reservoir 126. Consequently, in case of any failure, the pressure in the circuit 125 can be prevented from becoming too high, thereby protecting the pumping means 129 from becoming damaged. With the closed centre configuration of the valves 131A, B the aforementioned safety provision can be fulfilled by the pressure relief valve 142, which will simply open to the reservoir 126 when the pressure in the high pressure zone H exceeds a certain, predetermined level. Alternatively or additionally, the motor 135 can be designed to switch off. As a consequence, the fail safe valve 132 no longer has to include the aforementioned open safety mode. Instead, it can be designed to be completely closed in said safety mode, which allows for a more simple design.

The invention is not in any way limited to the exemplary embodiments presented in the description and drawing. All combinations (of parts) of the embodiments shown and described are explicitly understood to be incorporated within this description and are explicitly understood to fall within the scope of the invention. Moreover, many variations are possible within the scope of the invention, as outlined by the claims

What is claimed is:

1. A suspension assembly for a vehicle comprising a primary suspension assembly for suspending the vehicle wheels to a chassis of the vehicle and a secondary suspension assembly for suspending a cabin of a vehicle to the chassis, the secondary suspension assembly comprising:
   a plurality of spring members arranged between the cabin and the chassis of the vehicle, and
   a torsion bar comprising a midsection and two arms each extending substantially transverse to the midsection, each arm being pivotally connected to brackets of the chassis, said torsion bar extending between at least two of said spring members so as to increase the roll stiffness of the secondary suspension assembly,
   wherein the secondary suspension assembly further comprises a rotation actuator, said rotation actuator comprising a stationary house fixed directly to one of the arms and a rotary part fixed to an end of the midsection, said rotation actuator being arranged at a junction of the midsection with one of the arms that rotatably interconnects the midsection of the torsion bar and one of the arms of the torsion bar and adjusts a torsion angle of the torsion bar to allow active roll stabilization of the cabin.

2. The suspension assembly according to claim 1, wherein the torsion bar is coupled to the cabin by means of ball joints.

3. The suspension assembly according to claim 1, wherein the actuator is a hydraulic actuator.

4. The suspension assembly according to claim 3, wherein the actuator is driven by a hydraulic supply circuit with pumping means and a separate motor for driving said pumping means.

5. The suspension assembly according to claim 4, wherein a control unit is provided, to switch on, respectively switch off the motor, based on one or more measurable parameters which are indicative for the presence of roll motions.

6. The suspension assembly according to claim 4, wherein the separate motor is an electromotor.

7. The suspension assembly according to claim 4, wherein the hydraulic supply circuit comprises an accumulator and a closed centre valve arrangement, wherein the closed centre valve arrangement is a valve arrangement that in rest or centre position supplies the actuator with hydraulic pressure and substantially closes off all return lines to a hydraulic fluid reservoir.

8. The suspension assembly according to claim 1, the secondary suspension assembly further comprising a stabiliser bar, arranged to have its torsion axis extend substantially parallel to that of the torsion bar.

9. The suspension assembly according to claim 1, the secondary suspension assembly further comprising measurement means for measuring roll motions of the cabin and a control unit for controlling the actuator based on data received from the measurement means and a control strategy stored in said control unit.

\* \* \* \* \*